United States Patent [19]

Verhagen et al.

[11] 4,438,149
[45] Mar. 20, 1984

[54] SPREADABLE WATER-IN-OIL EMULSION BASED ON A HIGH-MELTING BUTTERFAT FRACTION AND A LIQUID OIL

[75] Inventors: Laurentius A. M. Verhagen, Vlaardingen; Janos Bodor, Voorburg, both of Netherlands

[73] Assignee: Lever Brothers Company, New York, N.Y.

[21] Appl. No.: 362,715

[22] Filed: Mar. 29, 1982

[30] Foreign Application Priority Data

Apr. 2, 1981 [NL] Netherlands .................. 8101639

[51] Int. Cl.³ ..................... A23D 3/00; A23D 3/02
[52] U.S. Cl. ................... 426/603; 426/607; 426/586; 426/804
[58] Field of Search ........... 426/586, 602, 603, 606, 426/607

[56] References Cited

U.S. PATENT DOCUMENTS

| | | | |
|---|---|---|---|
| 2,745,750 | 5/1956 | Shafer et al. | 426/603 |
| 3,519,435 | 7/1970 | MacCollum | 426/586 |
| 3,922,376 | 11/1975 | Strinning et al. | 426/603 |
| 4,005,228 | 1/1977 | Norris | 426/586 |
| 4,112,132 | 9/1978 | Badertscher et al. | 426/603 |
| 4,209,546 | 6/1980 | Johansson | 426/586 X |
| 4,307,125 | 12/1981 | Amer | 426/586 X |
| 4,316,919 | 2/1982 | Pelluso et al. | 426/603 |
| 4,350,715 | 9/1982 | Rek | 426/603 X |

*Primary Examiner*—Robert A. Yoncoskie
*Attorney, Agent, or Firm*—Amirali Y. Haidri; James J. Farrell

[57] ABSTRACT

The invention relates to a spreadable water-in-oil emulsion based on a high melting butterfat fraction and a liquid oil which is substantially free of solid fat crystals at 10° C. and to a process for producing said emulsion. The use of a high melting butter stearin fraction obtained by dry fractionation at 15°–30° C., as one of the fat components of the fatty phase of the emulsion enables the incorporation of up to 80% of liquid oil, preferably an oil having a relatively high level of polyunsaturated fatty acids.

17 Claims, No Drawings

SPREADABLE WATER-IN-OIL EMULSION BASED ON A HIGH-MELTING BUTTERFAT FRACTION AND A LIQUID OIL

The invention relates to a spreadable water-in-oil emulsion, based on a high-melting butterfat fraction and a liquid oil, as well as to a process for its preparation.

The preparation of a similar product, starting from cream and a vegetable oil, including a churning step, has been described in British Patent Specification No. 1,217,395. According to this patent specification a maximum amount of 30% of vegetable oil, based on the total amount of fat, can be included in the product, since higher concentrations of oil result in a product having too soft a consistency at room temperature.

There is a need for a spreadable emulsion including if possible a reduced amount of the expensive butterfat and an increased amount of oil, preferably vegetable oil having a high content of unsaturated fatty acids which have a favourable physiological effect, with the further object of obtaining a better spreadability at temperatures ranging from 5°–20° C. than that of conventional products.

It was found that a spreadable w/o emulsion can be prepared that satisfies these requirements.

The emulsion according to the invention comprises:
(i) an aqueous phase having a pH of from 4.0 to 7.0 and constituting at most 70 percent by weight of the total emulsion;
(ii) a fatty phase containing
  (a) a liquid oil which at 10° C. is substantially free of solid fat crystals and
  (b) a butter stearin fraction having the following solid fat contents:

$N_{10}=50-80$; $N_{20}=24-45$; $N_{35}=3-18$.

The above-mentioned solid fat contents have been measured as N-values according to the methods described in Journal of the American Oil Chemists' Society, 51, 1975, 316 (Van Putte et al).

The liquid oil consists preferably of a vegetable oil containing a relatively high level of polyunsaturated fatty acids, such as sunflower oil, soybean oil, safflower oil, cottonseed oil, rapeseed oil, corn oil, groundnut oil, or mixtures thereof.

It is also possible to use other vegetable or animal oils or low-melting fractions.

The butter stearin is a fraction obtained by the fractionation of butter in the presence of a solvent such as acetone or hexane, or in the presence of a surface-active substance (so-called Lanza fractionation) or in the absence of a solvent (so-called dry fractionation). Preferably the butter stearin is a fraction obtained by the dry fractionation of butter, as the use of solvents in dissolving and purifying oil causes part of the flavours to disappear when the solvent is removed. The dry fractionation is carried out at a temperature ranging from 15° to 30° C., preferably from 23° to 28° C. The butter stearin obtained by dry fractionation preferably has the following solid fat contents, expressed in N-values:

$N_{10}=55-70$; $N_{20}=35-45$; $N_{35}=8-13$.

The ratios between the components of the fatty phase of the emulsion are such as to impart to said phase the following preferred solid fat contents:

$N_{10}=15-40$; $N_{20}=9-20$; $N_{35}=0-5$.

To satisfy these criteria, the fatty phase will preferably contain 20–65 wt% of butter stearin and 35–80 wt%, preferably 40–65 wt% of liquid oil.

The emulsions according to the invention may also contain a certain amount of non-fractionated butterfat; these emulsions preferably comprise a fatty phase having the following composition: butter stearin 20–65%, liquid oil 35–80% and non-fractionated butterfat 0–45%, it being understood that the sum of the quantities by weight of the three components has to be 100%. This non-fractionated butter is preferably present in a dispersed form in the aqueous phase, which may further contain emulsifiers such as mono- or di-glycerides, lecithin, thickeners, proteins and water-soluble salts. The pH preferably lies between 4.5 and 5.5. The aqueous phase preferably contains 1–10 wt% of milk protein, based on the final product.

A preferred aqueous phase is bacteriologically acidified skim milk. As a rule the aqueous phase constitutes about 16 wt% of the total composition.

In principle however, the emulsions may be of the low calorie type and the aqueous phase constitutes above 16 wt%, for example 30–70 wt% of the total composition.

The process according to the invention for preparing the emulsion as defined above comprises
(a) liquefying butterfat and subsequently fractionating and separating the high-melting stearin fraction as defined above;
(b) preparing a fatty phase starting from the butter stearin thus obtained and a liquid oil which at 10° C. is substantially free of solid fat crystals and,
(c) subjecting the fatty phase thus obtained and an aqueous phase of pH 4.0–7.0 to cooling and working to obtain a spreadable product of the desired texture and plasticity.

The butterfat is prepared in a manner known per se, for example starting from cream which is converted into butter, followed by separation of the butter serum, or directly by centrifugation of cream. The butterfat is liquefied by heating it up to a temperature above melting point. Preferably a temperature is chosen which does not exceed 10° C. above melting point. This maximum heating temperature will in most cases approximate 45° C. Ideally, the butterfat is brought to a temperature ranging from 35° to 40° C.

The fractionation conditions have already been described above.

For the preparation of the spreadable product it is possible to dose the fatty and aqueous phases separately into an apparatus in which the cooling and working are effected.

It is also possible first to prepare a pre-emulsion, which is subsequently fed to the apparatus. Cooling and working of the emulsion can be carried out in a so-called Votator apparatus, consisting of one or more scraped-surface coolers in which the emulsion is rapidly deepcooled, and stirring vessels provided with pins in which post-crystallisation can take place. Apparatus of this type is described in Andersen & Williams: "Margarine", Pergamon Press, 2nd Ed., 1965.

According to another embodiment of the invention a cream is prepared starting from a mixture of butter stearin, liquid oil and optionally non-fractionated butterfat, which is injected into water or into diluted or non-diluted skim milk, followed by churning of the mixture, if desired after addition of a further amount of fat, particularly liquid oil.

The invention will now be illustrated by means of the following Examples:

EXAMPLE I (A)-Preparation of butterfat

Butterfat was prepared, starting from cream having a fat content of 38%, by centrifugation, followed by separation of the butterfat.

(B)-Preparation of butter stearin

Butterfat was heated to 40° C. and subsequently cooled (3° C./h) to 25° C.

The stearin obtained had the following characteristics:
$N_{10}=65$
$N_{20}=40$
$N_{35}=12$ (C)-Preparation of the fatty phase The fatty phase was prepared by mixing at 40° C.:
40% of sunflower oil
40% of butterfat (non-fractionated)
20% of stearin.

The fat mixture had the following characteristics:
$N_{10}=25$
$N_{20}=12$
$N_{35}=0.5$.

(D)-Preparation of a pre-emulsion

An aqueous phase (16%-pH 4.7), containing acidified skim milk, was emulsified in the above-mentioned fatty phase (84%), in which 0.1% of monoglyceride had been incorporated. The spread was prepared by feeding the pre-emulsion to Votator units according to the following scheme: A A C A, in which in a so-called A unit the pre-emulsions were rapidly cooled and worked and post-crystallisation took place in the so-called C unit.

The residence time in the A unit was 20-30 sec. and in the C-unit about 2 min.

On emerging from the first A unit the emulsion had a temperature of 15° C.; on emerging from the second A unit this temperature was 10° C. On emerging from the C unit the emulsion temperature was 13° C. and on emerging from the third A unit 10° C.

The hardness, expressed in C-values (determination according to Haighton et al-Journal of American Oil Chemists' Society, 36, (1959) p. 345) was:
$C_5=1400$ g/cm$^2$
$C_{10}=800$ g/cm$^2$
$C_{20}=100$ g/cm$^2$ The product was excellently spreadable at 5° and 20° C.

EXAMPLE II

The process prescribed according to Example I was repeated, except that the fractionation was carried out at 15° C., resulting in a stearin having the following solid fat contents:
$N_{10}=55$
$N_{20}=30$
$N_{35}=4$.

A fatty phase was prepared starting from 60% of stearin and 40% of sunflower oil.

The solid fat contents were as follows:
$N_{10}=30$
$N_{20}=14$
$N_{35}=0.7$.

The spread emerging from the Votator had the following characteristics:
$C_5=2100$ g/cm$^2$
$C_{10}=1300$ g/cm$^2$
$C_{20}=150$ g/cm$^2$ The product was eminently spreadable at 10° and 20° C.

EXAMPLE III

The process prescribed according to Example I was repeated, except that the fatty phase had been prepared starting from 60% of soybean oil and 40% of stearin.

The fat mixture had the following percentages of solid fat:
$N_{10}=20$
$N_{20}=11$
$N_{35}=1.0$.

The spread emerging from the Votator had the following characteristics:
$C_5=700$ g/cm$^2$
$C_{10}=400$ g/cm$^2$
$C_{20}=90$ g/cm$^2$.

The product was eminently spreadable at 5° and at 20° C.

EXAMPLE IV

The process prescribed according to Example I for the preparation of the butter stearin was repeated. A fatty phase was prepared, starting from 40 parts of butterfat, 20 parts of butter stearin and 20 parts of sunflower oil. Subsequently an artificial cream was prepared by injecting this fatty phase into 60 parts of skim milk and 60 parts of water. This artificial cream was allowed to stand overnight at 10° C. Subsequently 20 parts of sunflower oil were added and the pre-emulsion was churned until, besides skim milk, a product with the desired texture and plasticity was obtained.

The product was eminently spreadable at 10° and 20° C.

COMPARATIVE EXAMPLE

A pre-emulsion was prepared, starting from the aqueous phase of Example I and a fatty phase consisting of 40% of sunflower oil and 60% of non-fractionated butterfat, and was treated according to the process prescribed in Example I. The product thus obtained had the following C-values:
$C_5=$approximately 900 g/cm$^2$
$C_{10}=$approximately 300 g/cm$^2$ At 15° and 20° C. the product had no measurable C-value and it was substantially liquid.

We claim:

1. An edible spreadable water-in-oil emulsion comprising:
  (i) an aqueous phase having a pH of from 4.0 to 7.0 and constituting at most 70 percent by weight of the total emulsion;
  (ii) a fatty phase containing
    (a) a liquid oil which at 10° C. is substantially free of solid fat crystals and
    (b) a butter stearin fraction having the following solid fat contents:

$N_{10}=50-80$; $N_{20}=25-45$; $N_{35}=3-18$ wherein the ratios between the components of the fatty phase are such as to impart to the fatty phase the following solid fat contents:

$N_{10}=15-40; N_{20}=8-20; N_{35}=0-5.$

2. An edible emulsion according to claim 1, wherein the liquid oil is selected from the group consisting of sunflower oil, soybean oil, safflower oil, cottonseed oil, rapeseed oil, corn oil, groundnut oil and mixtures thereof.

3. An edible emulsion according to claim 1, wherein the butter stearin is a fraction obtained by fractionating butterfat at a temperature ranging from 15° to 30° C., in the absence of a solvent.

4. An edible emulsion according to claim 3, wherein the butter stearin has been obtained by fractionating butter fat at a temperature ranging from 23° and 28° C. in the absence of a solvent.

5. An edible emulsion according to claim 1, wherein the fatty phase contains from 20 to 65 percent by weight of butter stearin and from 35 to 80 percent by weight of liquid oil.

6. An edible emulsion according to claim 5, wherein the fatty phase contains from 40 to 65 percent by weight of liquid oil.

7. An edible emulsion according to claim 5, wherein said emulsion contains from 20 to 60 percent by weight of butter stearin and from 0 to 45 percent by weight of non-fractionated butterfat.

8. An edible emulsion according to claim 1, wherein the aqueous phase consists of a cream.

9. An edible emulsion according to claim 8, wherein the cream contains non-fractionated butterfat.

10. A process for preparing a spreadable emulsion according to claim 1, wherein
 (a) butterfat is liquefied and subsequently a high-melting butter stearin is separated therefrom by fractionation, having the following solid fat contents:

$N_{10}=50-80; N_{20}=25-45; N_{35}=3-18;$ (b) a fatty phase is prepared, starting from the butter stearin fraction obtained in step (a) and a liquid oil which at 10° C. is substantially free of solid fat crystals wherein the ratios between the components of the fatty phase are such as to impart to the fatty phase the following solid fat contents:

$N_{10}=15-40; N_{20}=8-20; N_{35}=0-5;$ (c) the emulsified mixture of fatty phase thus obtained and an aqueous phase of pH=4.0-7.0 are subjected to cooling and working to obtain a spreadable product of the desired texture and plasticity.

11. A process according to claim 10, wherein the fractionation is carried out in the absence of a solvent at a temperature ranging from 15° to 30° C.

12. A process according to claim 11, wherein the fractionation is carried out at a temperature ranging from 23° to 28° C.

13. A process according to claim 10, wherein the fatty and aqueous phases are separately fed to an apparatus in which they are subjected to cooling and working.

14. A process according to claim 10, wherein starting from the fatty phase and the aqueous phase a pre-emulsion is prepared, which is subsequently fed to an apparatus in which the emulsion is cooled and worked.

15. A process according to claim 10, wherein cream is prepared from a mixture of butter stearin and liquid oil which is injected into water, skim milk, or mixtures thereof after which the final mixture thus obtained is churned.

16. A process according to claim 15, wherein the cream is prepared from a mixture of butter stearin, liquid oil and non-fractionated butterfat.

17. A process according to claim 15, wherein fat is added to the final mixture prior to the churning step.

* * * * *